United States Patent [19]
Burmeister et al.

[11] Patent Number: 5,211,591
[45] Date of Patent: May 18, 1993

[54] SHIFT ROD QUICK CONNECT AND DISCONNECT

[75] Inventors: Scott N. Burmeister, Gurnee; Mark C. Noble, Waukegan, both of Ill.

[73] Assignee: Outboard Marine Corporation, Waukegan, Ill.

[21] Appl. No.: 898,481

[22] Filed: Jun. 15, 1992

[51] Int. Cl.⁵ ............................................. B60K 41/00
[52] U.S. Cl. ...................... 440/86; 403/71; 403/49; 403/258; 440/84; 440/900
[58] Field of Search .................. 440/900, 84-87, 440/63, 64, 53; 403/67, 71, 49, 260, 258; 74/480 B, 480 R, 469

[56] References Cited

U.S. PATENT DOCUMENTS

| | | | |
|---|---|---|---|
| 4,306,820 | 12/1981 | Nelson | 403/71 |
| 4,406,557 | 9/1983 | Suzuki et al. | 403/71 |
| 4,597,686 | 7/1986 | Petersen | 403/11 |
| 4,867,717 | 9/1989 | Burmeister et al. | 440/86 |

Primary Examiner—Edwin L. Swinehart
Attorney, Agent, or Firm—Michael, Best & Friedrich

[57] ABSTRACT

Disclosed herein is an outboard motor comprising a propulsion unit including a first member movable vertically to actuate a transmission in response to such vertical movement, a second member rotatably supported by the propulsion unit and adapted to be rotated by an operator either directly or indirectly, and a connection for detachably connecting the first and second members to effect vertical movement of the first member in response to rotation of the second member, which connection includes an aperture in the first member, a stud fixedly extending from the second member for movement in common therewith and received in the aperture, a resilient member fixed to the second member for movement in common therewith and including a part movable relative to the second member between an interfering position wherein the part is engagable with the first member to prevent withdrawal of the stud from the aperture and a spaced position affording removal of the stud from the aperture, a tab connected to the resilient member and adapted for actuation by an operator to deflect the part away from the interfering position, and a stop fixed to the second member for movement in common therewith and for preventing deflection of the part beyond the spaced position in the direction from the interfering position.

6 Claims, 1 Drawing Sheet

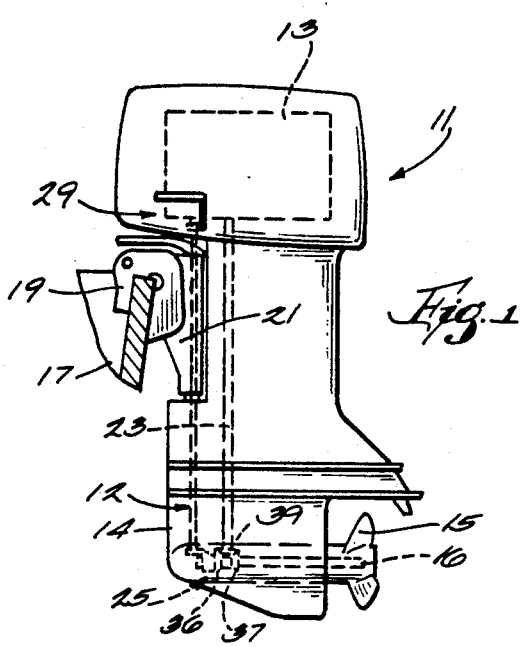
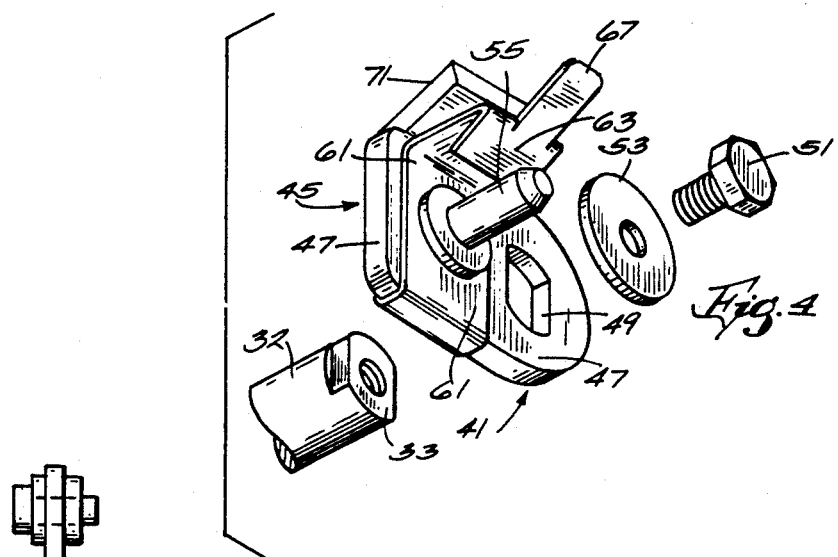
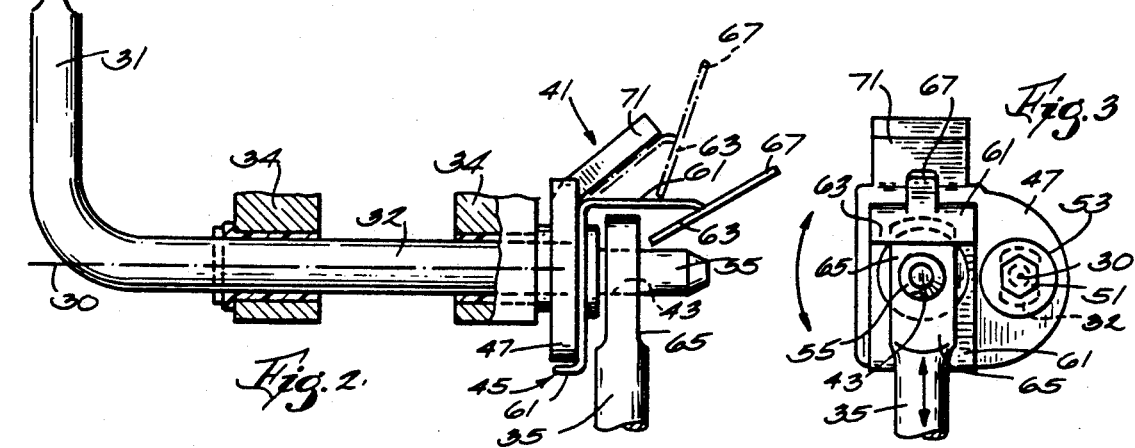

5,211,591

SHIFT ROD QUICK CONNECT AND DISCONNECT

BACKGROUND OF THE INVENTION

The invention relates generally to marine propulsion devices and, more particularly, to outboard motors. Still more particularly, the invention relates to a means for detachably connecting two members operable to actuate a transmission or clutch.

Attention is directed to U.S. Pat. Nos. 4,597,868 and 4,867,717 which disclose arrangements for detachably connecting two members operable in unison to actuate a clutch or transmission in a marine propulsion device.

SUMMARY OF THE INVENTION

The invention provides an outboard motor comprising a propulsion unit including a first member movable vertically to actuate a transmission in response to such vertical movement, a second member rotatably supported by the propulsion unit and adapted to be rotated by an operator either directly or indirectly, and means for detachably connecting the first and second members to effect vertical movement of the first member in response to rotation of the second member, which connecting means includes an aperture in the first member, a stud fixedly extending from the second member for movement in common therewith and received in the aperture, a resilient member fixed to the second member for movement in common therewith and including a part movable relative to the second member and between an interfering position wherein the part is engagable with the first member to prevent withdrawal of the stud from the aperture and a spaced position affording removal of the stud from the aperture, a tab connected to the resilient member and adapted for actuation by an operator to deflect the part away from the interfering position, and a stop fixed to the second member for movement in common therewith and for preventing deflection of the part beyond the spaced position in the direction from the interfering position.

The invention also provides a connector for detachably connected a first vertically movable member having therein an aperture, and a second member rotatably movable to effect vertical movement of the first member in response to rotation of the second member, which connector includes a base portion including means adapted for connection with the second member to provide common rotation therewith, a stud fixedly extending from the base portion for movement in common therewith and adapted to be received in the aperture, a resilient clip fixed to the base portion for movement in common therewith and including a part movable relative to the base portion and between an interfering position wherein the part is engagable with the first member to prevent withdrawal of the stud from the aperture and a spaced position affording removal of the stud from the aperture, which clip also includes a tab adapted for actuation by an operator to deflect the part away from the interfering position, and a stop fixed to the base portion for movement in common therewith and engageable with the clip to prevent deflection of the part beyond the spaced position in the direction from the interfering position.

Other objects and advantages of the invention will become known by reference to the following general description, claims and appended drawings.

THE DRAWINGS

FIG. 1 is a side elevational view of a marine propulsion device which includes connecting means in accordance with the invention.

FIG. 2 is an enlarged fragmentary view of the connecting means incorporated in the outboard motor shown in FIG. 1.

FIG. 3 is an end view of the connecting means shown in FIG. 2.

FIG. 4 is an exploded perspective view of certain of the components shown in FIGS. 2 and 3.

Before explaining the invention in detail, it is to be understood that the invention is not limited in its application to the details of construction and the arrangement of components set forth in the following description or illustrated in the drawings. The invention is capable of other embodiments and of being practiced or carried out in various ways. Also it is to be understood that the phraseology and terminology employed herein is for the purpose of description and should not be regarded as limiting.

GENERAL DESCRIPTION

Shown in FIG. 1 is a marine propulsion device 11 which is in the form of an outboard motor and which comprises a propulsion unit 12 including a gear case 14 supporting a propeller shaft 16 for rotary movement. Fixed on the propeller shaft 16 for common rotation therewith is a propulsion element in the form of a propeller 15.

In one embodiment, the propulsion unit 12 is pivotally attached to a water craft 17 by means including a stern bracket 19 which is fixed to the watercraft 17 and a swivel bracket 21 which is connected to the stern bracket 19 for rotation about a generally horizontal axis and connected to the propulsion unit 12 for common pivotal movement about the horizontal axis and for pivotal movement of the propulsion unit 12 relative to the swivel bracket 21 about a generally vertical axis.

Above the gear case, the propulsion unit 12 includes a power head including an internal combustion engine 13 drivingly connected to the propeller shaft 16 by a vertical drive shaft 23. In addition, the propulsion unit 12 includes a forward neutral and reverse transmission 25. In a preferred embodiment, this transmission is in the gear case 14 and includes a pair of counter-rotating bevel gears 36 and 37 which are mounted coaxially with the propeller shaft 16 and which are both driven by a pinion gear 39 attached to the lower end of the drive shaft 23 as is generally known in the art. The transmission 25 can be actuated to transfer rotation of the drive shaft 23 into either clockwise, counter clockwise, or no rotation of the propeller shaft 16 and associated propeller 15 by means of a shift assembly generally designated by the numeral 29.

The shift assembly 29 generally comprises (see FIG. 2) a manually operable member, lever or shaft 31 which is located near the engine 13, which includes a horizontally rotably shaft portion 32 having an end part 33, and which is operably connected to a power transfer means such as a dog clutch (not shown) which comprises part of the transmission 25, which is located on the propeller shaft 16, and which is operable to selectively engage a selected one of the two bevel gears 36 and 37. More specifically, the manually operated lever 31 is rotatably mounted about a generally horizontal axis 30 in a pair of supports 34 formed adjacent the lower portion of the internal combustion engine 13 and is adapted to be rotated by an operator, either directly from the hand of an operator or indirectly through a push-pull cable (not shown) from a remote location. This rotation causes, as will be explained hereinafter, vertical or almost vertical linear motion of a vertical shift rod, member, or link 35 which is operably connected to the clutch dog (not shown) to effect movement into and out of engagement with a selected one of the bevel gears 36 and 37 as is known in the art.

The shaft assembly 29 also includes connecting means 41 comprising, adjacent the upper end of the vertically extending link 35, an aperture 43. In addition, the connecting means 41 comprises a connector 45 which includes a base portion 47 including a non-circular hole 49 receiving the end part 33 of the shaft portion 32 in a manner affording common rotation of the shaft portion 33 and the connector 45. Still more specifically, the end part 33 of the shaft portion 32 is fixed in the hole 49 in the connector 45 by a nut 51 which passes through a washer 53 and into the end part 33.

The connector 45 also includes a pin or stud 55 which extends horizontally from the base portion 47 and is received in the aperture 43 to effect vertical movement of the link 35 in response to rotary movement of the lever 31.

The connector 45 also includes resilient means in the form of a resilient clip 61 which is suitably fixed or connected to the base portion 47 and which includes a part 63 movable between an interfering position (shown in full lines in FIG. 2) wherein the part 63 is engagable with the back side 65 of the upper end of the vertically movable link 35 to prevent withdrawal of the stud 55 from the aperture 43, and a spaced position (shown in dotted out line in FIG. 2) wherein the part 63 is clear of the upper end of the vertically movable link 35 and permits withdrawal of the stud 55 from the aperture 43. The bias of the resilient clip 61 urges the part 63 into the interfering position.

Still further, the resilient clup 61 includes a tab 67 which, in the disclosed construction, extends from the part 63 and is actuatable by a user to displace the part 63 away from the interfering position and to the spaced position.

In addition, the connector 45 preferably includes a stop 71 which fixedly extends from the base portion 47 and is engagable by the resilient clip 61 to prevent excessive movement of the part 63 in the direction away from the interfering position and beyond the spaced position. Such prevention of excessive movement of the part 63 prevents bending of the resilient clip 61 to a position wherein the desired resilience thereof is lost.

The disclosed construction provides an economical, effective, and easily operable arrangement for connecting and disconnecting the lever 31 and the vertically movable link 35, for reliably retaining the lever 31 and link 35 in connected operable relationship, and for easily permitting disconnection of the lever 31 and the link 35 by temporarily displacing the interfering part 63 of the resilient clip 61 away from the interfering position. In this regard, no tools are required for assembly and disassembly of the connection. In addition, the disclosed arrangement does not contemplate any loose parts such as cotter pins or washers.

Various of the features of the invention are set for in the following claims.

We claim:

1. An outboard motor comprising a propulsion unit including a first member movable vertically to actuate a transmission in response to such vertical movement, a second member rotatably supported by said propulsion unit and adapted to be rotated by an operator either directly or indirectly, and means for detachably connecting said first and second members to effect vertical movement of said first member in response to rotation of said second member, said connecting means including an aperture in said first member, a stud fixedly extending from said second member for movement in common therewith and received in said aperture, a resilient member fixed to said second member for movement in common therewith and including a part movable relative to said second member between an interfering position wherein said part is engagable with said first member to prevent withdrawal of said stud from said aperture and a spaced position affording removal of said stud from said aperture, a tab connected to said resilient member and adapted for actuation by an operator to deflect said part away from said interfering position, and a stop fixed to said second member for movement in common therewith and for preventing deflection of said part beyond said spaced position in the direction from said interfering position.

2. An outboard motor in accordance with claim 1 wherein said first member in a lever.

3. An outboard motor in accordance with claim 1 wherein said second member is a link.

4. An outboard motor in accordance with claim 1 wherein said stop is rigid with respect to said second member.

5. An outboard motor in accordance with claim 1 wherein said part engages the side of said first member at a location remote from said second member.

6. A connector for detachably connecting a first vertically movable member having therein an aperture, and a second member rotatably movable to effect vertical movement of the first member in response to rotation of the second member, said connector including a base portion including means adapted for connection with the second member to provide common rotation therewith, a stud fixedly extending from said base portion for movement in common therewith and adapted to be received in the aperture, a resilient clip fixed to said base portion for movement in common therewith and including a part movable relative to said base portion and between an interfering position wherein said part is engagable with the first member to prevent withdrawal of said stud from the aperture and a spaced position affording removal of said stud from the aperture, said clip also including a tab adapted for actuation by an operator to deflect said part away from the interfering position, and a stop fixed to said base portion for movement in common therewith and engagable with said clip to prevent deflection of said part beyond said spaced position in the direction from said interfering position.

* * * * *